April 13, 1937.  E. J. PILBLAD ET AL  2,076,963
BRAKE LOCKING DEVICE FOR MOTOR VEHICLES
Filed Nov. 16, 1932   2 Sheets-Sheet 1
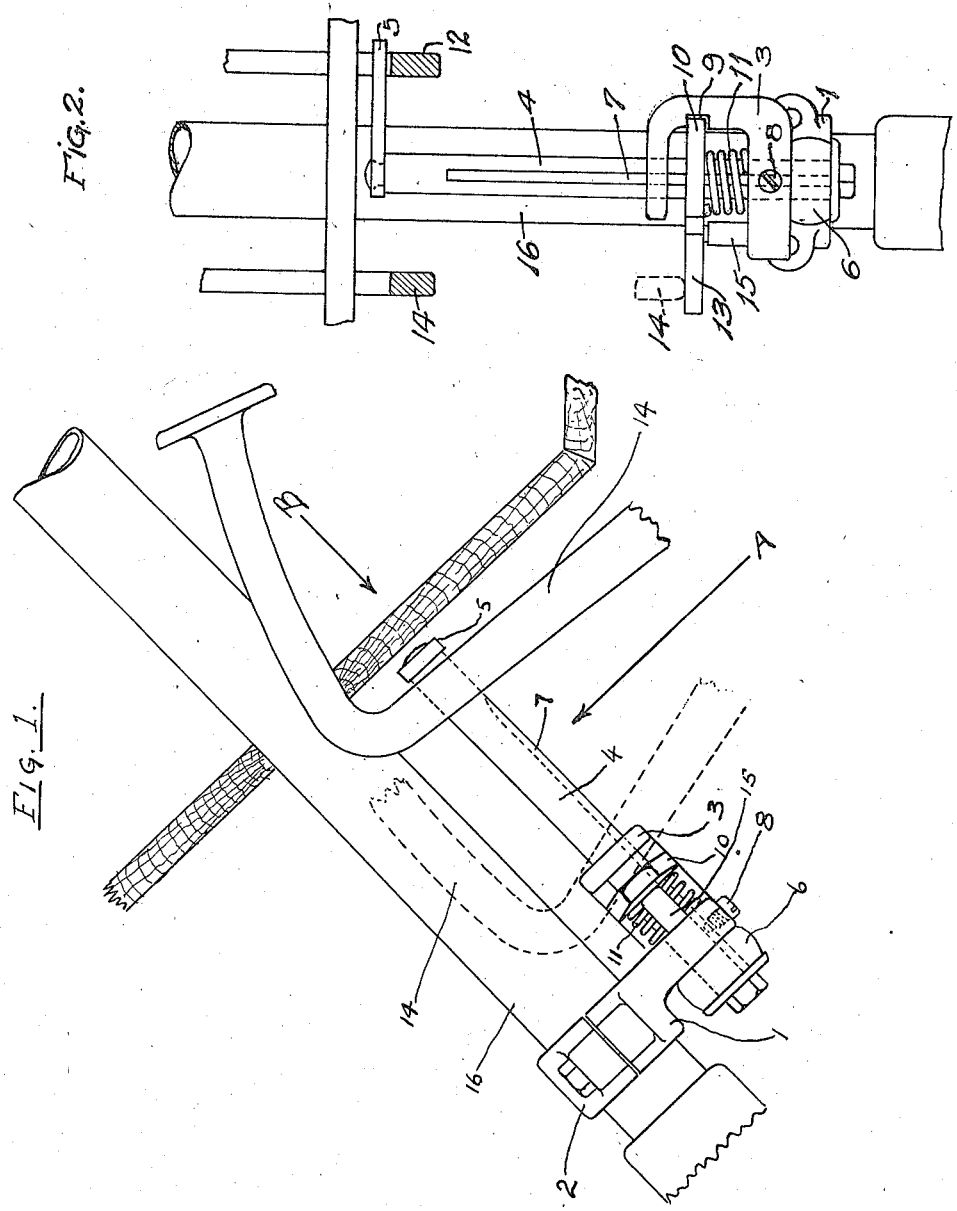
INVENTORS.
Eric J. Pilblad
Charles C. Strange.

April 13, 1937.  E. J. PILBLAD ET AL  2,076,963
BRAKE LOCKING DEVICE FOR MOTOR VEHICLES
Filed Nov. 16, 1932  2 Sheets-Sheet 2

INVENTORS.
Eric J. Pilblad.
Charles C. Strange.

Patented Apr. 13, 1937

2,076,963

UNITED STATES PATENT OFFICE 2,076,963

BRAKE LOCKING DEVICE FOR MOTOR VEHICLES

Eric J. Pilblad and Charles C. Strange, Rockville Centre, N. Y.

Application November 16, 1932, Serial No. 642,862

22 Claims. (Cl. 192—13)

This invention relates to control means and more particularly to a locking device for controlling the operation of lever mechanisms such as, for example, the brake and clutch pedals of a motor vehicle.

One of the objects of the present invention is to provide novel means for automatically locking the brake mechanism of a vehicle in applied position.

Another object is to provide novel mechanism whereby the service brakes of a vehicle may be held in applied position and be released by the normal operation of the clutch mechanism.

Still another object is to provide a novel device for locking the brakes of a vehicle in applied position, the holding action of which is independent of the clutch mechanism but controlled thereby.

A further object is to provide a brake locking device adapted to be controlled by the clutch mechanism of a vehicle which is so constructed that both the clutch and brake mechanisms may, if desired, be actuated without being affected by said device.

A still further object is to provide novel lever locking mechanism comprising but a small number of lightweight, comparatively rugged parts, and which is easy to manufacture, inexpensive and reliable.

The above and further objects and novel features of this invention will more fully appear from the following detailed description when taken in connection with the accompanying drawings. It is to be expressly understood, however, that the drawings are for the purpose of illustration only and are not designed as a definition of the limits of the invention, reference being had primarily to the appended claims for this purpose.

In the accompanying drawings similar letters and figures of reference indicate like parts throughout the several views.

Figure 1 is a sectional side view through part of a vehicle showing one embodiment of the present invention as applied to the vehicle and its relation to the clutch and brake pedals of the vehicle.

Figure 2 shows an elevation of parts shown in Figure 1 viewed from the direction indicated by arrow A in Figure 1.

Figure 3:
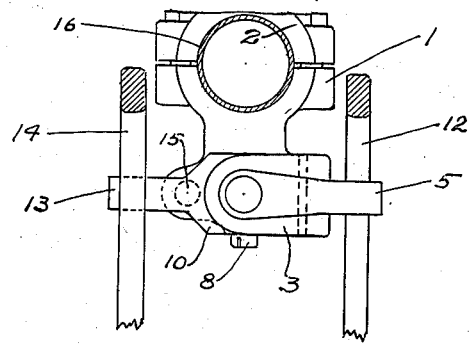
Figure 3 is a plan view of parts shown in Figure 1 viewed from the direction indicated by arrow B in Figure 1.
Figure 4:
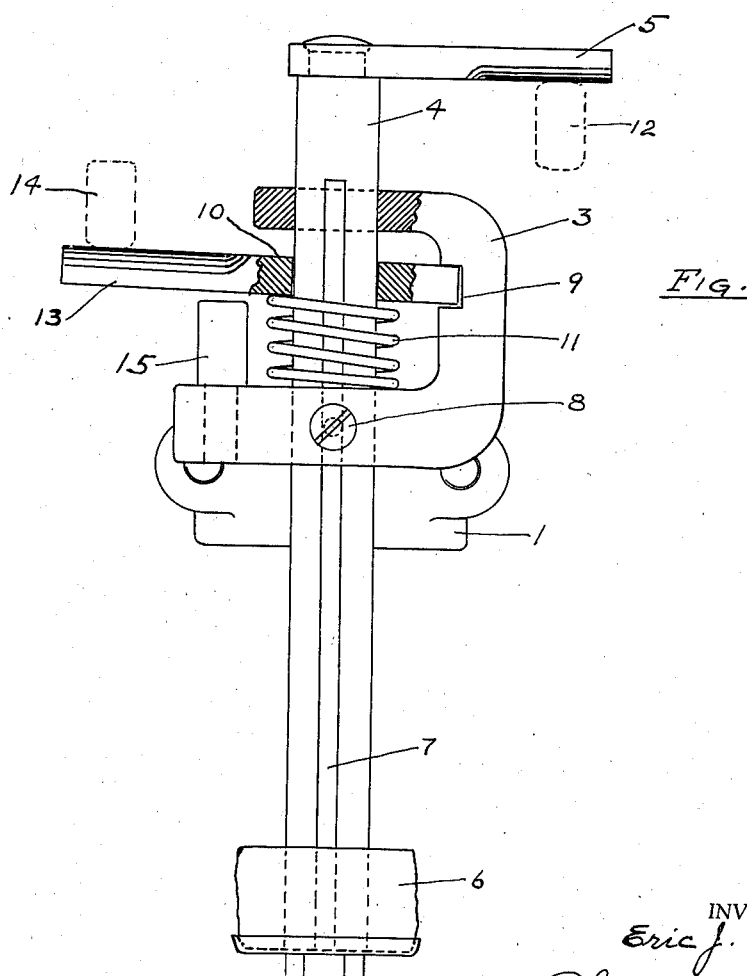
Figure 4 is a larger scale view shown partly in section illustrating the several actuating parts of the invention in their relation to each other. The view point is same as in Figure 2.

In these drawings 1 indicates a bracket and 2 a clamp adapted to clamp rigidly around the steering column 16 of a vehicle, the bracket 1 being extended into a U shaped frame 3 having two bearing holes in which a round rod 4 is slidably supported. The upper end of rod 4 has a laterally protruding arm 5 adapted to engage the upper edge of the brake pedal lever 12 and the lower end thereof is provided with a resilient cushion 6 to make the operation of the device silent. 7 is a slot into which the inner end of a screw 8 in frame 3 extends to prevent any rotational movement of rod 4. U shaped frame 3 has a slot 9 in which slot the locking pawl 10 is pivotally supported. The pawl 10 has a hole therein of a size large enough to pass freely over rod 4 when said pawl and rod are at right angles to each other but small enough so that when pawl 10 is tilted over by the action of spring 11 its pinching action is sufficient to prevent upward movement of the rod 4 by any pressure exerted on arm 5 by the brake pedal 12. The pawl 10 has an extension 13 reaching far enough out to engage the under edge of clutch pedal lever 14. 15 is a stud the top surface of which is in line with the lower edge of slot 9, the same serving as a definite stop for pawl 10 at a point when pawl 10 is at right angles to rod 4, thus allowing free movement of rod 4 through frame 3 when pawl 10 is held down on stop stud 15 by the action of clutch pedal lever 14.

From the foregoing description of the illustrated embodiment of the invention it will be easy to understand the following explanation of the action and operation of the device.

When only using the brake for modifying the speed of the car (i. e., without using the clutch mechanism of the vehicle) it is obvious that the device remains inoperative and there is nothing to interfere with the action of the brake pedal, the rod 4 with its arm 5 remaining in its normal inoperative position because of the frictional resistance set up between rod 4 and pawl 10 by the action of spring 11.

When it is desired to bring the vehicle to a stop, the brake pedal is applied as usual and also in the normal way, the clutch pedal is fully depressed, whereupon the clutch pedal lever 14 will move pawl 10 against stop stud 15 thereby leaving rod 4 with its arm 5 free to drop by its own weight until arm 5 strikes the upper edge of brake pedal lever 12. The gears are then shifted to neutral in the normal way, and the clutch pedal let back to its normal position. The moment the clutch pedal lever 14 starts back the pressure is removed from pawl 10 and the pawl is instantly tilted upwards into its locking position by spring 11, thereby securely locking the rod 4 with its arm 5 securely to the U shaped frame and bracket 1 and holding brake pedal 12 in depressed position. The brakes are thus held in applied position without the application of foot pressure on either the clutch or brake pedal, thus permitting the operative to relax both legs until it is again desired to start the vehicle. This is a great advantage when stopping on an incline because it relieves the foot of the fatigue which would otherwise result from keeping the brakes applied by the pressure of the foot and does away with the necessity of using the hand brake. Also in starting the vehicle, the right foot is free for use on the accelerator to obtain the correct engine speed for starting, the brakes being automatically released in a manner to be hereinafter pointed out. In starting up the clutch pedal is depressed until it stops against extension 13 of pawl 10, the spring 11 being sufficiently strong to resist the ordinary foot pressure required to depress the clutch pedal. The gears are now shifted into low and then a slight extra pressure by the foot on the clutch pedal will press pawl 10 against stop stud 15 thereby instantly releasing rod 4 with its arm 5 and permitting the brake pedal to be instantly returned to its released position by the usual spring means provided in the vehicle for that purpose, said pedal carrying rod 4 back to its normal non-operating position. The cushion 6 is provided to deaden the blow and silence the action. The moment the brakes are released by the action of the downward motion of the clutch pedal, the clutch pedal is released in the usual manner to permit the engagement of the clutch mechanism, the right foot being free for use on the accelerator to obtain the correct engine speed for starting. There is thus no danger of stalling the engine and the usual rolling back on a steep grade is eliminated. We have established experimentally that the action of this device will lock the brakes and keep the vehicle stationary on any grade on which the vehicle can be safely run. It has also been found that with a device embodying the present invention the amount that the car will roll back in the time interval between the release of the brakes at the end of the clutch stroke and the establishment of a driving connection during the return stroke of the clutch pedal is negligible even on the steepest grade which the car is able to negotiate.

While only one specific form of the invention has been illustrated and described, it is obvious that many changes may be made without departing from the spirit of the invention as defined in the following claims.

We claim:

1. The combination with the brake and clutch pedals of a vehicle of a locking device comprising a rigid supporting frame attached to the vehicle, a movable element slidably extending through said frame, said movable element being disconnected from and adapted to engage said brake pedal, and locking means for frictionally resisting movement of said element.

2. The combination with the brake and clutch pedals of a vehicle, of a locking device comprising a supporting frame rigidly attached to said vehicle, a movable element slidably extending through said frame, said element being mounted independently of and adapted to engage the brake pedal, locking means for resisting movement of said movable element, and means engageable by the clutch pedal for controlling said locking means.

3. The combination with the brake pedal and clutch mechanism of a vehicle of a locking device comprising a supporting frame adapted to be rigidly attached to the vehicle, a movable element slidably extending through said frame, said element being adapted to engage the brake pedal and to move independently thereof, frictional means for holding said element in a fixed position relative to said supporting frame, and means controlled by the operation of said clutch mechanism for controlling said frictional means.

4. In combination with a motor vehicle and its brake and clutch mechanism, a brake locking device comprising a supporting frame adapted to be attached to the vehicle, a rod slidably supported by said frame for movement independent of the brake mechanism, a member on the upper end of said rod for engaging the brake mechanism of the vehicle, a locking member supported by said frame, said locking member having an opening therein for receiving said rod, and means for normally holding said locking member in operative position.

5. The combination with the brake and clutch pedals of a vehicle of a locking device comprising supporting means mounted on the vehicle, a rod slidably supported by said means for movement independent of said brake pedal, means on said rod adapted to engage the brake pedal, a locking member pivotally mounted on said supporting means and adapted to engage said rod, and means for holding said member in locking engagement with said rod.

6. The combination with a motor vehicle and its brake and clutch mechanism, a locking device comprising a supporting frame adapted to be rigidly attached to the vehicle, a rod slidably supported by said frame, means on said rod for engaging the brake pedal of the vehicle, a locking member pivotally mounted on said supporting frame said member having an opening therein for receiving said rod, and means for normally holding said member in tilted relation to said rod, a portion of said locking member being adapted to be engaged by the clutch pedal of the vehicle.

7. In combination with a motor vehicle and its brake mechanism, a brake locking device comprising a supporting frame adapted to be rigidly attached to the vehicle, a rod slidably supported by said frame and being adapted to engage the brake pedal of the vehicle, a locking member for normally holding said rod against movement relative to said supporting frame, an extended portion of said locking member being adapted to be engaged by the clutch pedal of the vehicle, and means for limiting the movement of said locking member when engaged by the clutch pedal.

8. In combination with the brake and clutch mechanism of a motor vehicle, a brake locking device comprising a supporting frame rigidly attached to the steering column of the vehicle, a movable member slidably supported by said frame, a portion at the upper end of said member being adapted to engage the upper side of the brake pedal, cushioning means interposed between the lower end of said member and said frame, means for normally holding said member against movement on the frame, and means controlled by the clutch operating system of the vehicle for releasing said holding means.

9. In combination with the brake and clutch mechanism of a motor vehicle, a brake locking device comprising a supporting frame rigidly attached to the steering column of a vehicle, a movable member slidably supported by said frame, said member having a portion at the upper end thereof adapted to engage the upper side of the brake pedal of the vehicle, means for holding said member against rotational movement, cushioning means interposed between the lower end of said member and said frame, means for normally holding said member against movement relative to the frame, and means controlled by the clutch mechanism for releasing said holding means.

10. The combination with the brake and clutch mechanisms of a motor vehicle of a locking device comprising a supporting member rigidly secured to a stationary portion of the vehicle, an element mounted for longitudinal movement on said supporting member, said element being mounted independently of and adapted to engage the brake mechanism, and locking means mounted on said supporting member and controlled by the clutch mechanism for normally resisting movement of said element.

11. The combination with the brake and clutch mechanisms of a vehicle of a locking device comprising supporting means mounted on the vehicle, a movable element slidably supported by said means, said element being adapted to engage the brake mechanism and to move independently thereof, a locking member mounted on said supporting means and adapted to engage said element, and resilient means for holding said member in locking engagement with said element.

12. The combination with the brake and clutch mechanisms of a vehicle of a locking device comprising supporting means, a movable member adapted to engage the brake pedal, said member being slidably mounted on said means independently of the brake pedal, and locking means mounted on said supporting means and controlled by the clutch pedal for normally holding said movable member against movement relative to said supporting means.

13. The combination in a motor vehicle of a brake pedal, a clutch pedal, a guide member rigidly mounted on the vehicle, means including a movable member slidably extending through said guide member, said movable member having a portion adapted to engage said brake pedal, means for mounting said brake pedal for movement independently of said first-named means, and locking means controlled by said clutch pedal for normally holding said movable member against movement to lock said brake pedal in depressed position.

14. The combination in a motor vehicle of a brake pedal, a clutch pedal, a guide member rigidly mounted on the vehicle, means including a movable member slidably extending through said guide member, said movable member having a portion adapted to engage said brake pedal, means mounting said brake pedal for movement independently of said first-named means, and means for locking said movable member against movement relative to said guide member including a pivotally mounted locking member and means for maintaining said locking member in locking engagement with said movable member.

15. In combination with the brake and clutch mechanisms of a motor vehicle, a brake locking device comprising a supporting frame mounted on said vehicle, a member surrounded by said frame having a portion adapted to engage the brake mechanism and to move independently thereof, means for normally holding said member against movement on said frame, and means controlled by the clutch operating system of the vehicle for releasing said holding means.

16. In combination with the brake and clutch mechanisms of a motor vehicle, a brake locking device comprising a member slidably supported on said vehicle for movement independent of said brake mechanism, a portion of said member being adapted to engage said mechanism at the will of the operative, and means mounted independently of said member for frictionally holding the same against movement independently of the efforts of the operative.

17. In a motor vehicle having a clutch pedal, a brake pedal and a steering column in a plane between said pedals, the combination therewith of a supporting member rigidly secured to said steering column, a locking member having an opening therein pivotally supported by said supporting member, an element engaging the brake pedal and extending through said opening in the locking member whereby the vehicle brakes may be frictionally held in applied position, said locking member having a portion adapted to be directly engaged by the clutch pedal and limit the clutch disengaging movement thereof, and resilient means for resisting movement of said locking member by the clutch pedal.

18. The combination with the brake and clutch mechanisms of a vehicle of a locking device comprising a guide member rigidly mounted on the vehicle, a movable member slidably engaging said guide member, said movable element being adapted to engage said brake mechanism, cushioning means interposed between portions of said member and element, and locking means controlled by said clutch mechanism for frictionally resisting movement of said element relative to said member.

19. The combination in a motor vehicle of a brake pedal, a clutch pedal, guide means rigidly mounted on the vehicle, a movable member slidably engaging said guide means, said movable member having a portion adapted to engage said brake pedal, cushioning means interposed between said element and guide means, locking means for resisting movement of said movable element, and means engageable by the clutch pedal for controlling said locking means.

20. The combination with the brake and clutch mechanisms of a motor vehicle of a locking device comprising a guide member, a movable element slidably engaging said guide member and adapted to engage the brake mechanism, locking means for resisting movement of said movable element, means engageable by the clutch pedal for controlling said locking means to release the brake mechanism, and means interposed between said element and guide means for cushioning the movement of the brake mechanism when the same is released by said locking means.

21. The combination with the brake and clutch mechanisms of a vehicle of a locking device comprising a guide member rigidly mounted on the vehicle, movable means having a portion slidably engaging said guide member and a portion adapted to engage said brake mechanism, cushioning means interposed between portions of said member and said movable means, and locking means controlled by said clutch mechanism for frictionally resisting movement of said element relative to said member.

22. In a motor vehicle having a clutch pedal and a brake pedal, the combination therewith of a supporting means rigidly secured to the vehicle in a plane between said pedals, locking means having an opening therein pivotally supported by said supporting means, means engaging said brake pedal having a portion extending through said opening in the locking means whereby the vehicle brakes may be frictionally held in applied position, said locking means having a portion adapted to be directly engaged by the clutch pedal and limit the clutch disengaging movement thereof, and resilient means for resisting movement of said locking means by the clutch pedal.

ERIC J. PILBLAD.
CHARLES C. STRANGE.